US009843499B2

(12) United States Patent
Pettovello (10) Patent No.: US 9,843,499 B2
(45) Date of Patent: Dec. 12, 2017

(54) DISTRIBUTED DATABASE SERVER NETWORK AND MAINTENANCE PROCESS

(71) Applicant: General Motors LLC, Detroit, MI (US)

(72) Inventor: Primo M. Pettovello, Canton Township, MI (US)

(73) Assignee: General Motors LLC, Detroit, MI (US)

( * ) Notice: Subject to any disclaimer, the term of this patent is extended or adjusted under 35 U.S.C. 154(b) by 136 days.

(21) Appl. No.: 14/810,259

(22) Filed: Jul. 27, 2015

(65) Prior Publication Data

US 2017/0034040 A1  Feb. 2, 2017

(51) Int. Cl.
| G06F 15/173 | (2006.01) |
| H04L 12/715 | (2013.01) |
| H04L 29/08 | (2006.01) |
| H04L 12/743 | (2013.01) |

(52) U.S. Cl.
CPC .......... *H04L 45/04* (2013.01); *H04L 45/7453* (2013.01); *H04L 67/1095* (2013.01); *H04L 67/1097* (2013.01)

(58) Field of Classification Search
USPC ....... 709/238, 223, 203, 212, 226, 213, 228, 709/246
See application file for complete search history.

(56) References Cited

U.S. PATENT DOCUMENTS

| 2003/0198189 A1* | 10/2003 | Roberts | H04L 45/60 370/252 |
| 2003/0200295 A1* | 10/2003 | Roberts | H04L 41/12 709/223 |
| 2004/0054924 A1* | 3/2004 | Chuah | H04L 47/10 726/22 |
| 2012/0166734 A1* | 6/2012 | Zeidner | G06F 12/0862 711/137 |
| 2013/0346937 A1* | 12/2013 | Kennedy | G06F 17/5081 716/122 |
| 2015/0245167 A1* | 8/2015 | Bobrow | H04W 4/008 455/41.2 |
| 2015/0271836 A1* | 9/2015 | Damnjanovic | H04W 72/0413 370/329 |

* cited by examiner

*Primary Examiner* — Jude Jean Gilles
(74) *Attorney, Agent, or Firm* — Christopher DeVries; Reising Ethington P.C.

(57) ABSTRACT

A scalable distributed server system and method to maintain the system, wherein the system comprises a top virtual layer that includes a fixed or variable number of virtual buckets, wherein a virtual bucket maps an input to a routing bucket in one or more middle routing layers; and a bottom server layer that includes a variable number of servers that each include a database that stores data and an application that recalls data from and stores data into the database, wherein the one or more middle routing layers comprise a variable number of routing buckets that route input received from a virtual bucket in the top virtual layer to a server contained within the bottom server layer.

12 Claims, 5 Drawing Sheets

DISTRIBUTED DATABASE SERVER NETWORK AND MAINTENANCE PROCESS

TECHNICAL FIELD

The present invention relates to distributed database server systems and, more specifically, to routing data within the distributed database server systems.

BACKGROUND

The amount of data collected and stored is growing quickly, and it is therefore becoming more difficult to store and retrieve data with relatively low latency. Typical server systems use one or more centralized servers to manage all of the data. While typical systems have their advantages, namely for managing small sets of data, these systems have a number of disadvantages as well. One of the disadvantages of a centralized server is that it may not be able to scale to the increased Internet scale demands for millions and billions of devices. Distributed server systems seek to solve this problem by spreading the data among numerous databases so that no single database contains a very large amount of data and/or has a very large processing load. By distributing data in this fashion, each server maintains a much smaller subset of the data and thus lookups and other operations can be performed much faster. The typical distribution model creates a web application tier and a separate database tier. These distributed systems allow for better database scalability relative to centralized server systems. Compounding the size challenge is that the data may arrive non-stop twenty-four hours per day every day of the year. Further compounding the challenge is the need to complete ever increasingly complex calculations in shorter periods of time to enable modern real-time analytics. Although distributed server systems allow for much better scalability of database systems, there are some drawbacks that have yet to be addressed.

For instance, when a database is taken offline, either for maintenance or other reasons, the data stored at that database becomes unavailable. Current distributed server systems use algorithms, such as Apache Hadoop™, which allow for the data that was stored on that database to always be available. However, for many of these systems to work properly multiple copies of all the data—three copies for Apache Hadoop™—may need to be maintained. With large data sets, these extra copies take up a lot of storage space and reducing the amount of copies, even by one, can save a lot of storage space. Storage space savings is not the only reason for the Apache Hadoop™ architecture, as the number of input-output operations is drastically limited with current computing architectures that the scale-out architecture of Apache Hadoop™ addresses.

SUMMARY

According to an embodiment of the invention, there is provided a scalable distributed server system, comprising a top virtual layer that includes a fixed or variable number of virtual buckets, wherein a virtual bucket maps an input to a routing bucket in one or more middle routing layers; and a bottom server layer that includes a variable number of servers that each include a database that stores data and an application that recalls data from and stores data into the database, wherein the one or more middle routing layers comprise a variable number of routing buckets that route input received from a virtual bucket in the top virtual layer to a server contained within the bottom server layer.

According to another embodiment of the invention, there is provided a scalable distributed server system, comprising a top virtual layer that includes a fixed or variable number of virtual buckets, wherein a virtual bucket maps an input to a routing bucket in one or more middle routing layers; and a bottom server layer that includes a variable number of servers that each include a database that stores vehicle transactional data and an application that manages the vehicle transactional data at the database, wherein the one or more middle routing layers comprise a variable number of routing buckets that route the vehicle transactional data received from a virtual bucket to a server in the bottom server layer.

Additionally, according to another embodiment of the invention, there is provided a method of migrating data from a first database to a second database, comprising the steps of receiving a key at a top virtual layer that includes a fixed or variable number of virtual buckets and then routing the key through one or more middle routing layers to a bottom server layer that includes a variable number of servers; determining if the key is located in a first database in the bottom server layer; copying data identified by the key from the first database to a second database in the bottom server layer, and then deleting the data for the key from the first database when it is determined that the key is contained within the first database; and storing the data in the second database when it is determined that the key is not contained within the first database.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below enable a data network to maintain large amounts of data by providing a scalable and dynamic system that is capable of maintaining relatively low-latency database operations while allowing significant change and/or growth in data storage size without taking the system offline. The system uses a three-or-more-tiered database server architecture that allows for the addition and removal of databases. The data network contains three-or-more layers each having a plurality of buckets. The tiers of the data network are as follows: a top virtual layer;

one or more middle routing layers; and a bottom server layer. The top virtual layer may contain a fixed or variable number of virtual buckets. A bucket (e.g. virtual bucket, routing bucket, or server bucket) can be a computer system that contains one or more servers, databases, devices and/or applications. However, in other embodiments, a bucket may refer to an application that is deployed on a computer. A virtual bucket in the top virtual layer may communicate with a routing bucket in a middle routing layer and with other networks. The middle routing layer may consist of a variable number of routing buckets. A middle routing bucket may communicate with a server bucket in the bottom server layer, a virtual bucket in the top virtual layer, or another routing bucket in the middle routing layer. The bottom server layer may contain a variable number of buckets.

In one embodiment, the server buckets contain databases that store the bulk of the data network's data. For example, vehicle transactional data may be stored in the databases of the server buckets. In one embodiment of the data network, a vehicle may send transactional data to a server bucket. Upon the data network receiving the transactional data at a virtual bucket, the transactional data will then be sent down to a routing bucket in the routing layer, and finally to a server bucket in the server layer.

In another embodiment, one or more buckets from each of the layers can be deployed to the same computer. In this embodiment, the buckets may comprise an application that is deployed to a computer. For example, a virtual bucket, a routing bucket, and a server bucket can all be deployed to the same computer. The respective buckets may still perform their separate and independent processes. In this implementation, the hardware hierarchy can be described by a peer-to-peer (P2P) type architecture.

The three-or-more-tiered database server architecture, as described in brief detail above, permits dynamic database growth and flexibility, as compared with current distributed database systems. For example, when a database in the bottom server layer reaches its maximum capacity, another database may be added to the bottom layer of the data network. The data from a first database in the bottom layer that has been filled may be copied over to the second database in the bottom layer using the method disclosed herein. In another example, during the removal of a database, the data stored at that database can be copied to another database using the same method disclosed herein. The layered database structure can be used with vehicle transactional data. For example, the vehicle communications system and data network allow for the storage of vehicle events in the form of vehicle transactional data. In one example, a vehicle operator may turn on a vehicle, or perform some other vehicle function, which triggers a vehicle event. Vehicle transactional data reflecting the vehicle function is sent to a data network to be stored.

Communications System—

Figure 1:
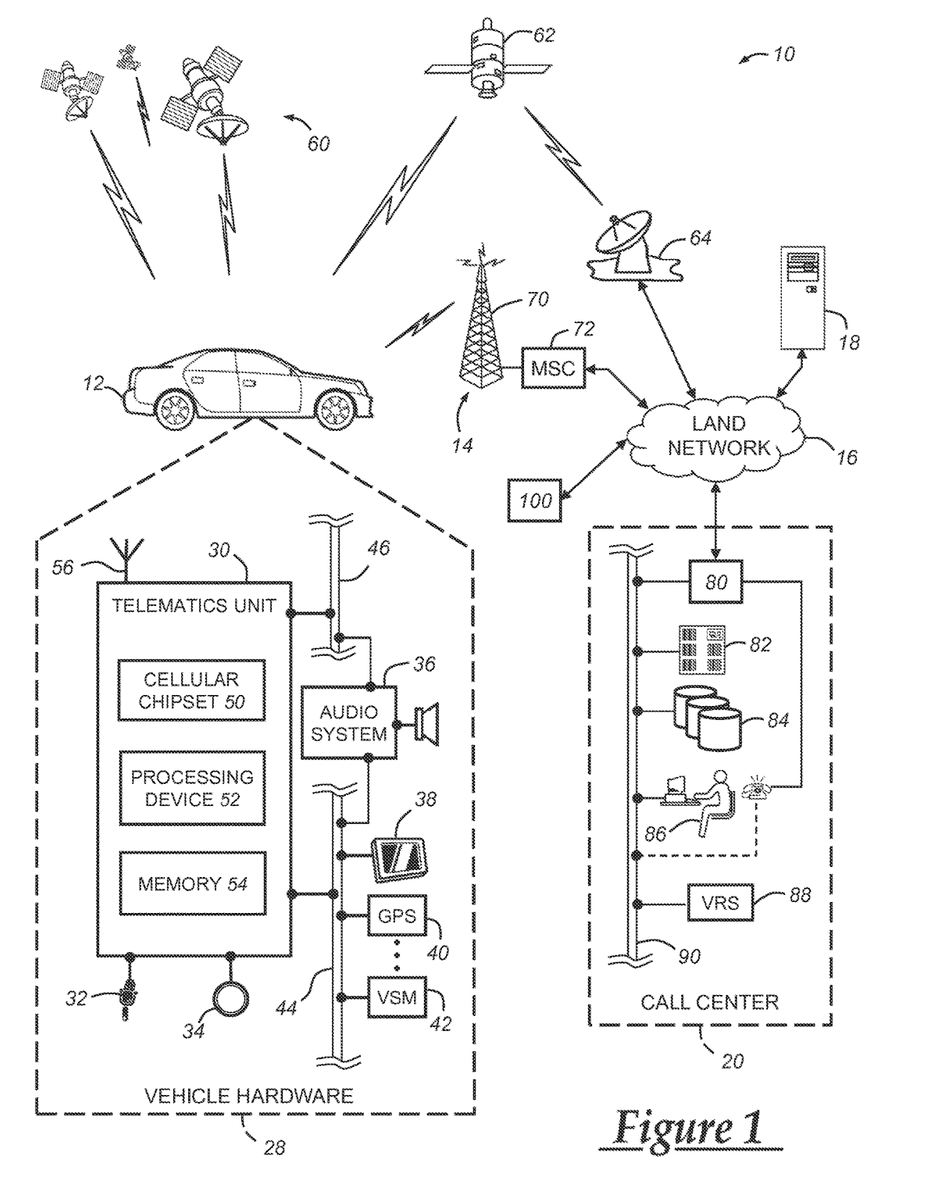
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Data network 100 may include one or more computers, databases, servers, or devices. Data network 100 is designed to provide the system with data storage capabilities. Data network 100 may communicate with computer 18, call center 20, vehicle 12, or any other device accessible to it through the wireless carrier system 14 and/or land network 16. In another embodiment, data network 100 may be communicatively connected to other computer networks, as may be known to those skilled in the art. Data network 100 may receive data from a network device, such as vehicle telematics unit 30, and upon receiving this data, may store the data, recall and return other data, process the data, or perform any combination these operations.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
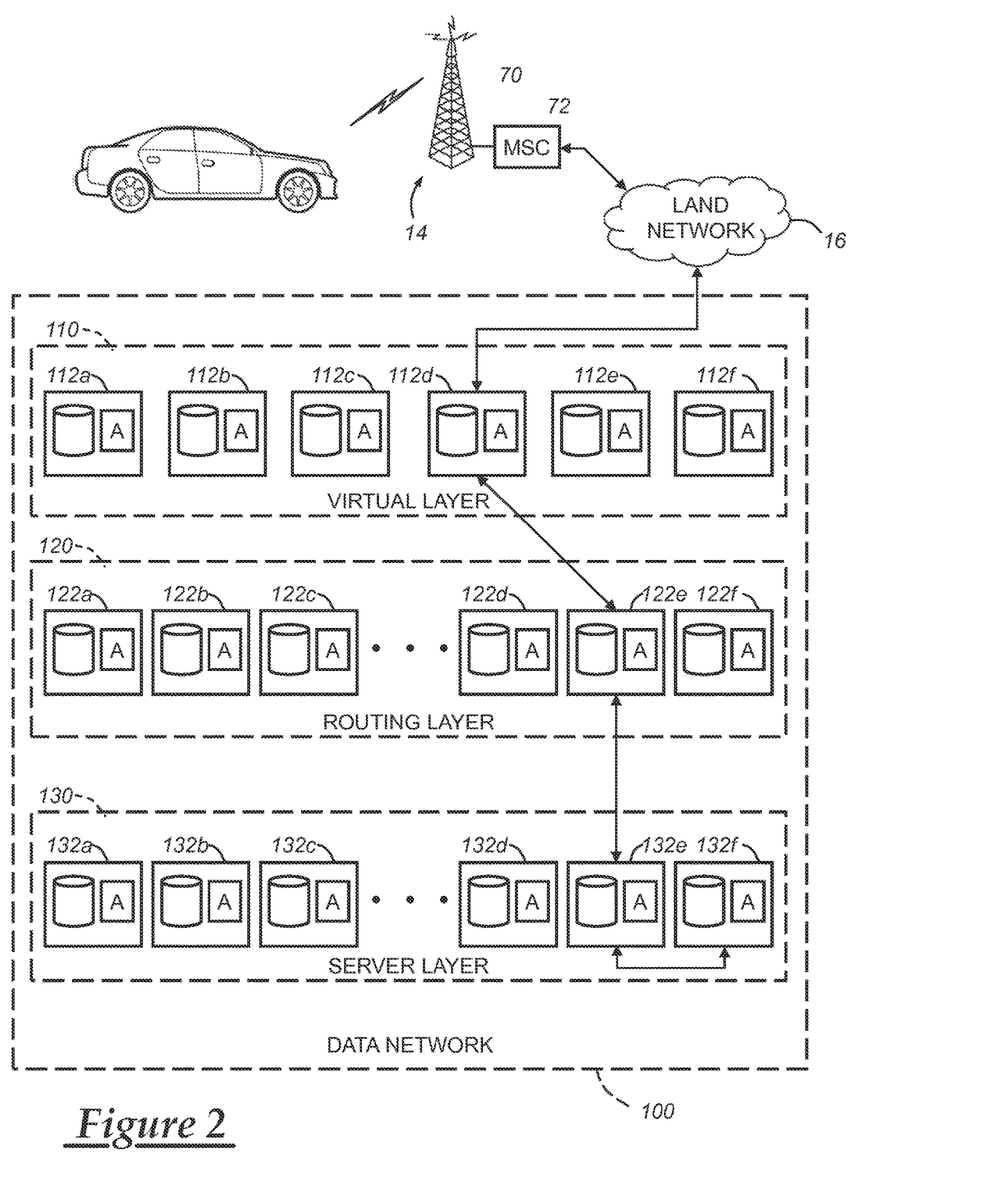
FIG. 2 is a block diagram depicting an embodiment of a communication system and distributed server system network that is capable of utilizing the method disclosed herein.

With reference to FIG. 2, there is shown a portion of operating environment 10 as it involves data network 100. The data network 100 is structured into three or more layers including a top virtual layer 110, one or more routing layers 120, and a server layer 130. Each layer contains one or more buckets that each contain one or more databases, servers, devices, and/or applications. The buckets of a layer may communicate with a bucket in a layer above or below it. In some embodiments, a bucket may also communicate with other buckets within its layer. The top virtual layer 110 may communicate with other networks, such as land network 16. While the virtual and routing buckets may contain a database and a server, they may primarily be used to communicate requests and responses between the bottom server layer 130 and other networks, such as land network 16. In one embodiment, the bottom server layer 130 may house the bulk of the stored data. For example, if data network 100 was used to store vehicle transactional data, all of the data for a vehicle could be stored in a database in a bucket of the bottom server layer 130. Also, the buckets of the bottom server layer may be situated such that they all have the appropriate metadata and requisite applications to perform computations on the data stored in the bucket's corresponding database and/or on data received from another bucket.

The first of these layers, top virtual layer 110, may contain a fixed or variable number of virtual buckets 112a-f. For explanation purposes, only six virtual buckets are shown, although any number of virtual buckets may make up virtual layer 110. In one embodiment, virtual buckets 112 may communicate with land network 16 via the Internet infrastructure, and/or other networks, namely through packet-switched data communication protocols. Virtual buckets 112 may communicate with other buckets via a local interconnection network (LIN), a local area network (LAN), and other appropriate connections such as Ethernet or others that conform with known ISO, SAE and IEEE standards and specifications, to name but a few. Virtual buckets 112 may communicate with other virtual buckets or routing buckets 122 in the middle routing layer 120 through similar means. For simplicity, there are only shown a few connections between the buckets (i.e. one possible route from vehicle 12 to server buckets 132). However, a large number of different paths could be used. Virtual layer 110 may contain a fixed number of virtual buckets, which means that the addition or removal of virtual buckets after the initial deployment of the data network 100 is not intended in this embodiment; although, in some limited circumstances, one or more virtual buckets may be added or removed from the virtual layer 110. In other embodiments, the virtual layer 110 may contain a variable number of virtual buckets, which means that a virtual bucket may be added or removed during regular operation of data network 100 without disturbing the performance and/or capabilities of the data network 100.

One middle routing layer 120 is shown; however, more than one middle routing layer can be used in the data network 100. Each middle routing layer contains one or more routing buckets 122a-f, that each may contain one or more databases, servers, devices, and/or applications. The routing buckets 122 are similar in function and hardware makeup to the virtual buckets 112 except that the routing buckets 122 direct data between the virtual buckets 112 and the server buckets 132. The routing buckets 122 may route data from virtual buckets 112 to server buckets 132 or other routing buckets 122 contained within the same routing layer or within an adjacent routing layer. In the case of multiple routing layers, a routing bucket may communicate directly with a routing bucket in a routing layer above or below it. Each routing layer contains a variable number of routing buckets 122, meaning that a routing bucket may be added or removed during regular operation of data network 100 without disturbing the performance and/or capabilities of the data network 100. For example, upon the addition of a new server bucket in the server layer 130, the routing buckets may receive an updated index table or other address routing information. The newly added server bucket may be completely initialized (i.e. loaded with all the necessary software, populating the database with the desired data, etc.) before the routing buckets 122 route any requests to the new server bucket. Likewise, the virtual buckets 112 do not need to change any of their functionality or settings because the routing buckets 122 in routing layer 120 will handle all of the necessary new bucket addressing and/or desired re-routing behavior.

The bottom server layer 130 contains a variable number of server buckets. Each server bucket includes one or more databases, servers, devices, and/or applications. The server buckets may communicate with one another or with one or more routing buckets. The server layer 130 contains a variable number of server buckets, meaning that a server bucket may be added or removed during regular operation of data network 100 without disturbing the performance and/or capabilities of the data network 100. In one embodiment, the system 100 may use one server bucket for each routing bucket. However, in such an embodiment of the system 100, there may temporarily be more routing buckets than server buckets or vice versa when a server or routing bucket is being added or removed.

In one embodiment, the databases contained within the server buckets of server layer 130 may each contain transactional data relating to one or more vehicles, such as vehicle 12. For example, the database in server layer 130 may store data relating to vehicle functions of the vehicle 12, such as detecting turning on the ignition. Here, each server bucket 132 may store a certain portion of the overall transactional data to be maintained within data network 100 (i.e. a first server bucket may contain and manage data related to a certain set of vehicles; a second server bucket may contain and manage data related to another set of vehicles; etc.). Additionally, each server bucket may contain all of the necessary metadata and software needed to carry out all operations to be performed on the transactional data. Consequentially, a central server may not be needed to process and/or maintain the transactional data. Moreover, because of the data network architecture and communication capabilities therein, the server buckets 132 can operate in concert when processing large computations on data that may be distributed over multiple server buckets (e.g. aggregate calculations, etc.).

Figure 3:
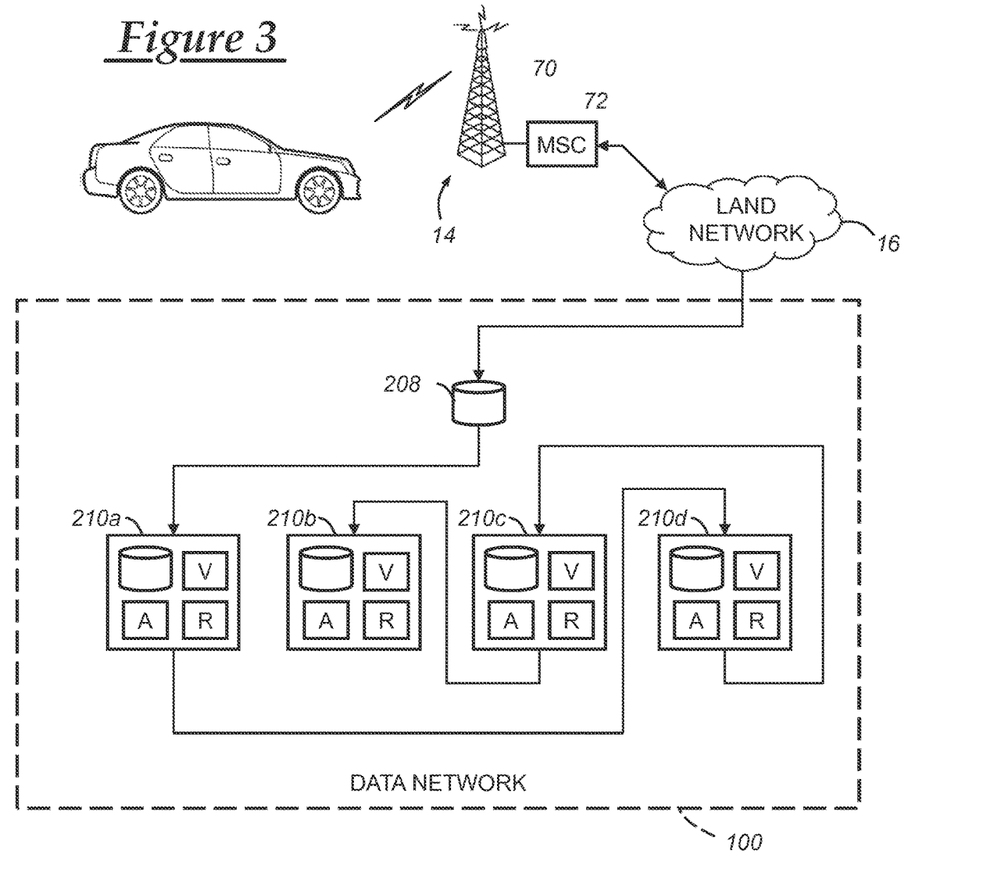
FIG. 3 is a block diagram depicting an embodiment of a communication system and distributed server system network that is capable of utilizing the method disclosed herein.

With reference to FIG. 3, there is shown a portion of operating environment 10 as it involves data network 100 and is implemented as a separate embodiment. FIG. 3 depicts a data network 100 that is implemented as a peer-to-peer (P2P) network rather than a hierarchical arrangement shown with reference to FIG. 2. The data network 100 is structured into three layers including a top virtual layer, a routing layer, and a server layer. Each layer contains one or more buckets, wherein a bucket, for purposes of this embodiment, comprises an application that is deployed to a computer. In this embodiment, four computer nodes 210a-d are shown; however, any number of computer nodes may be used. Each computer node may comprise of a single computer which may have more than one bucket. Although a few connections between the computer nodes 210 are shown, any computer node may directly communicate with any other computer node.

Figure 4:
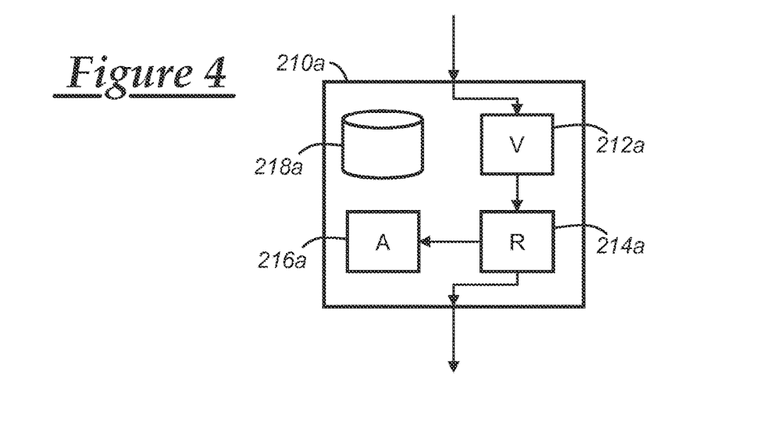
FIG. 4 is a block diagram depicting a detailed portion of the embodiment of the distributed server system network shown in FIG. 3.

With reference to FIG. 4, there is shown an expanded view of the computer node 210a of FIG. 3. As shown, computer node 210a has a virtual bucket 212a, a routing bucket 214a, a server bucket 216a, and a database 218a. Virtual bucket 212a may receive data that was sent to the computer node 210a from another computer node or device in the data network 100 or from an external network device (e.g. vehicle 12, computer 18) via land network 16. After the virtual bucket 212a processes the data, the data may be passed along to routing bucket 214a. Routing bucket 214a may be a routing application that has access to a routing table, routing map, or other routing means wherein routing information is stored. After the routing bucket 214a determines the data's target destination, the routing bucket 214a can pass the data to the server bucket 216a, another computer node 210, or any other appropriate destination. If the data is passed to the server bucket 216a, then the server can store the data in database 218a.

This embodiment of data network 100 allows the system to operate using a peer-to-peer (P2P) architecture in which all of the computer nodes 210 can communicate with one another. The computer nodes 210 each include a virtual bucket that receives input (i.e. data) from a different computer or device (e.g. devices external to the data network, such as vehicle 12; other computer nodes 210). In some embodiments, such as the system shown in FIG. 3, the data network 100 may route all input through an input queue 208. Virtual buckets, such as virtual bucket 212*a*, can then pull data from the input queue 208 as needed (e.g. when it has the ability to process more data). This allows for the data received at the data network 100 to be distributed among different virtual and routing layers so that no single bucket has a disproportionate and/or overwhelming amount of input to process, which may cause the system to bottleneck.

In another embodiment of data network 100, the virtual and routing buckets may be applications that are stored on the same computer and the server bucket may be another application that is stored on another computer. This embodiment is a combination of the embodiments shown in FIG. 2 and FIG. 3. This embodiment includes a hardware hierarchical structure similar to the embodiment shown in FIG. 2 and it also includes multiple buckets deployed to a single computer, as in the embodiment shown in FIG. 3. The computer containing both a virtual and routing bucket can receive input and then determines where to send the data to be processed and/or stored. The routing bucket (e.g. application) may determine the specific server bucket to send the data to. Alternatively, the routing bucket may pass the data to another virtual bucket in another computer and that computer will then be queried as to what server the data should be sent to. The data may keep being passed to other virtual/routing computers until its proper destination (i.e. server bucket) is found.

For purposes of simplicity, FIG. 2 and FIG. 3 each only show one system of communication between vehicle 12 and data network 100; however, vehicle 12 may communicate with data network 100 through use of any system described above with reference to FIG. 1, or through use of any other communication systems facilitating communications between a vehicle and a computer in a network. The vehicle 12 is shown communicating with the data network 100 through use of wireless carrier system 14 in conjunction with land network 16. However, other configurations are possible. It should be appreciated that all buckets of a single layer do not need to be, and in many embodiments, will not be, located at the same geographic location as each other.

Method—

Figure 5:
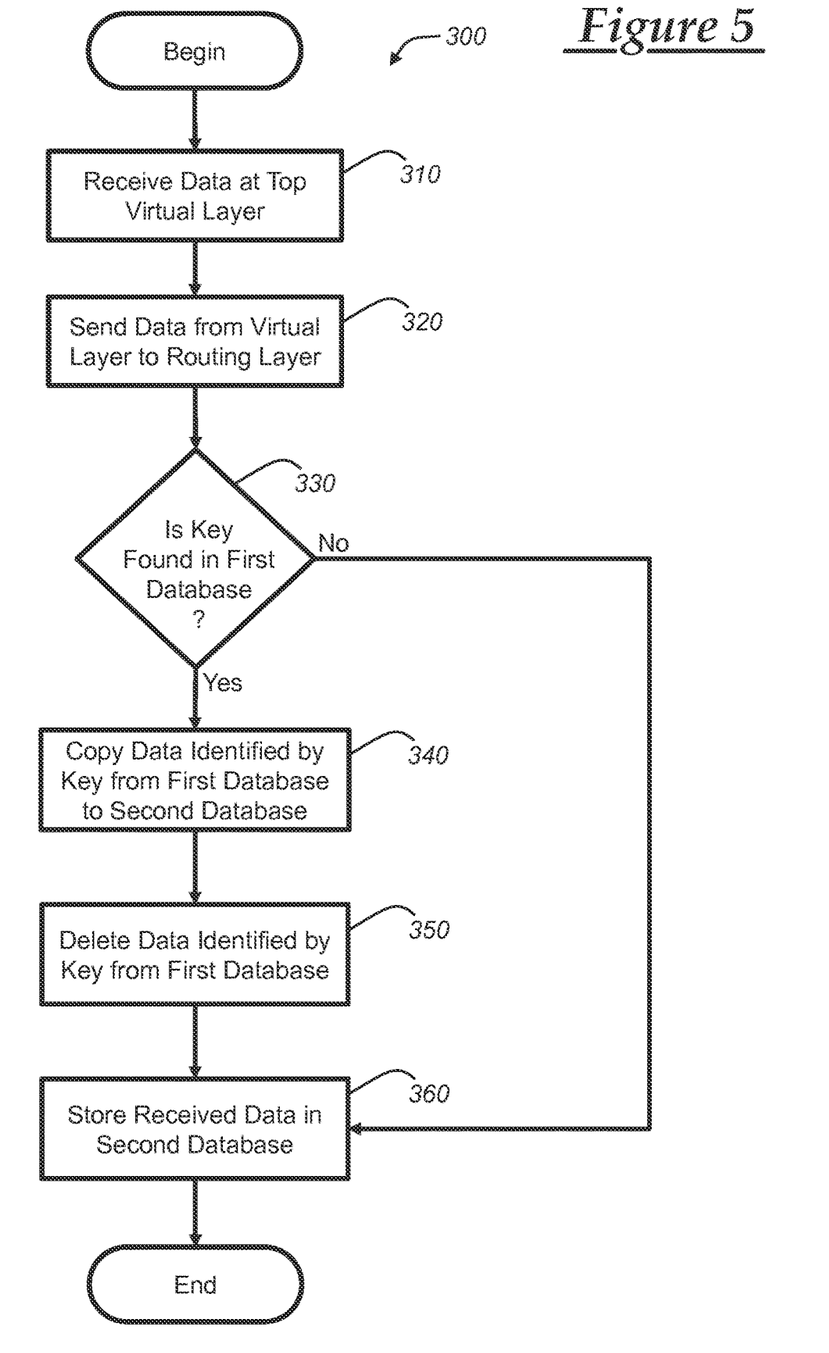
FIG. 5 is a flowchart illustrating a method of migrating data from a first database to a second database.

Turning now to FIG. 5, there is a method 300 of migrating data from a first database to a second database. For instance, one database can be represented in server bucket 132*a* and another in server bucket 132*b*, as is shown in FIG. 2. An application may be run on a computer device that may include a processor and memory, which is represented in server buckets 132*a* and 132*b*. The applications in the server buckets 132 may store data into, and recall data from, their corresponding database(s), as well as process data. The first step of method 300 is to receive data at the top virtual layer 110 of the data network 100. The top virtual layer may receive data via land network 16 from vehicle 12. In one embodiment, the data received may describe some vehicle event or aspect of a vehicle operation for a certain vehicle, such as vehicle 12. For example, when a vehicle operator starts vehicle 12, vehicle 12 may use the cellular chipset 50 in telematics unit 30 to send data reflecting this event that is ultimately received by the top virtual layer 110 via a wireless carrier system 14 and land network 16. The data may be routed by vehicle 12 to a certain virtual bucket, such as virtual bucket 112*d*, using a hashing algorithm or other consistent distribution mechanism so that data for a given vehicle may be consistently directed to a certain virtual bucket.

The data sent by the vehicle 12 may contain a key, such as the vehicle identification number (VIN) of the vehicle 12. Before the vehicle 12 sends the data, the vehicle 12 may use a hashing algorithm to first determine which virtual bucket 112 to send the data to. The hashing algorithm may use the VIN, or any manipulation of the VIN, as a key (input) for the hashing algorithm. Upon the determination of which virtual bucket should receive the data, the data may be transmitted by vehicle 12 to a virtual bucket in virtual layer 110, such as virtual bucket 112*d*. In another embodiment, this routing determination may be made by a device that is remote to vehicle 12 and data network 100. For example, vehicle 12 may send its transactional data to a computer 18. Next, computer 18 then may process the data using a hashing algorithm to determine which virtual bucket 112 should receive the transactional vehicle data.

After the virtual bucket receives the data, the virtual bucket 112*d* may then process or record the data, as well as perform other operations in response to receiving the data. For example, the key (e.g. VIN) may be processed by an application contained within a virtual bucket 112*d*. The application may use a consistent hashing algorithm to determine the appropriate routing bucket in the routing layer to receive the data. The data for a single vehicle may be stored inside a certain server bucket contained within server layer 130, and because the routing layer is dynamic (i.e. the number of routing buckets may change at any time), it may be beneficial for the algorithm used to route the data from a virtual bucket to a routing bucket to be consistent. The algorithm used to route the data to the correct routing bucket can be flexible with regard to the dynamic bucket architecture. Many algorithms can be used to carry this out, such as a consistent hashing algorithm. The method 300 proceeds to step 320.

At step 320, the data is sent from the virtual bucket 112*d* to a routing bucket in the routing layer 120. There, one of the buckets in the routing layer 120, such as routing bucket 122*e*, receives the data. In one embodiment, the data may be received via a local area network (LAN) or other appropriate network infrastructure, as is known to those skilled in the art. Routing bucket 122*e* may process the data, and/or perform any other operations in response to receiving the data. Next, routing bucket 122*e* may send the data, and/or other information, to one or more other routing buckets 122 or to a server bucket 132, such as server bucket 132*e*.

After the server bucket 132 receives data, a database contained within the server bucket 132 is queried to determine if the database contains any data associated with the data received. In one embodiment, an application contained within the server bucket 132 may determine if the database contains information for that vehicle 12 by querying the database for the vehicle's VIN. This determination may be made by the application querying the database by executing prepared SQL statements, or by the application using any other database querying method known to those skilled in the art. Upon the determination that the vehicle information is contained within the database, step 340 is carried out. Otherwise, the method continues to step 360.

In step 340, data that is associated with a certain key is copied over from a database in a first server bucket, such as server bucket 132*e*, to a database in a second server bucket, such as server bucket 132*f*. For example, a database in a first server bucket, such as server bucket 132*e*, may be queried by an application contained within the first server bucket. The application may use prepared SQL statements or any other database querying methods known to those skilled in the art. After the application retrieves the result of the query (e.g. data tuples), it may process these results and then send this data to a second server bucket, such as bucket 132*f*, via any of a number of ways: directly to the second server bucket; to one or more intermediary server buckets and then to the second server bucket; to one or more routing buckets and then to the second server bucket; or any other such path included in the data network 100 and communications system 10.

Upon the second server bucket receiving the data that was initially contained in the database of the first server bucket, an application in the second server bucket may then insert the data into a database contained within the second server bucket. In one embodiment, the application may first process the data to prepare it to be entered into the database. Next, the database may use prepared SQL statements, or any other method known to those skilled in the art, to insert the data into the database of the second server bucket. After a successful insertion of this data, the application in the second server bucket may send a response signal indicating this successful insertion to the first server bucket via any of the possible previously disclosed paths between the first and second server buckets. Upon the first server bucket receiving this response signal, method 300 may continue with step 350. In a different embodiment, step 350 may proceed immediately after the data is first sent to the second server bucket, or any other time after step 340 has begun.

In step 350, the data identified by the key from the original incoming data (e.g. the data received by data network 100 from vehicle 12) is deleted from the database in the first server bucket. This is the same data that was copied over in the preceding step 340. This data may be deleted by the application of the server bucket executing database querying language statements, such as prepared SQL statements.

Upon completion of step 350, or the determination that the key is not contained in the database in the first server bucket in step 330, step 360 begins by storing the data received from the vehicle into a database in the second server bucket. An application, namely a database server application, in the second server bucket may execute a set of database query commands to insert this data into the database.

Figure 6:
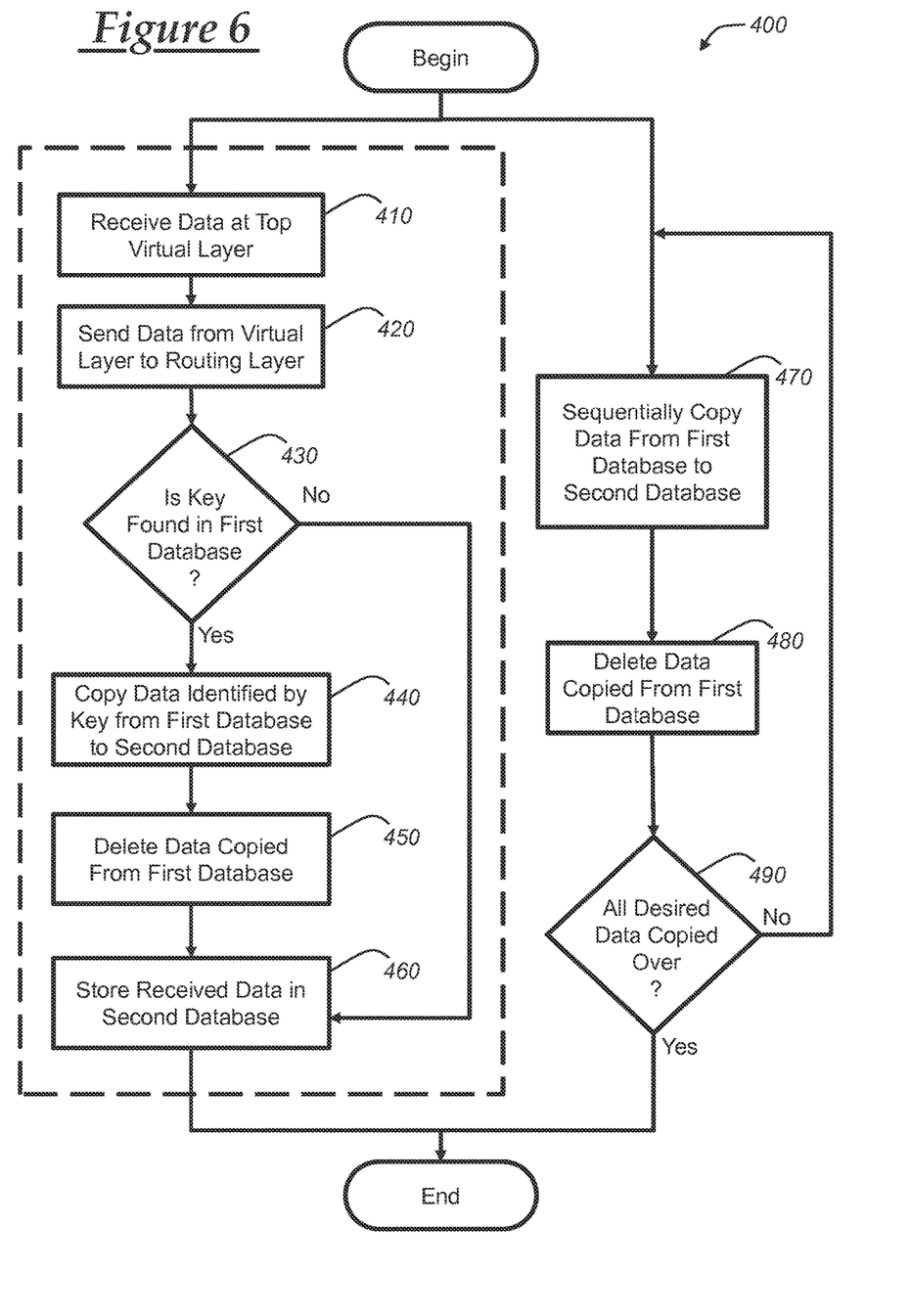
FIG. 6 is a flowchart illustrating another method of migrating data from a first database to a second database.

Turning now to FIG. 6, there is a method 400 of moving data from a first database to a second database. The method 400 involves two processes that both may move data independently from a first database to a second database. The first process (steps 410-460) can move data from the first database to the second database after receiving data input into the data network 100. The second process can move data in a fashion that may not be dependent on receiving external data into the data network 100. The second process may be initiated at the same time, a later time, or an earlier time than the first process.

Method 400 may be used to migrate vehicle transactional data over from a first pre-existing database to a second newly created database. Vehicle transactional data may be data sent from the vehicle 12 to the data network 100 that is indicative of some vehicle action or state. For example, after a vehicle operator turns the ignition on, data indicating this vehicle event may be sent to data network 100. As shown in method 300, the vehicle 12 can send this transactional data and all the data relating to vehicle 12 from a first database to a second database. This may be useful when a new server bucket is added to server layer 130 for servicing a growing amount of data that data network 100 handles. However, it may be desirable to transfer data of latent vehicles from the first database to the second database. If the vehicle 12 is stored and/or not operated for a long period of time, the data network 100 may not receive a transaction for that vehicle and the data for that vehicle may not be transferred over from the first database to the second database. In some implementations, vehicle data contained in a database for a vehicle is only transferred upon receiving a transaction from that vehicle. Steps 470-490 of method 400 may be used to overcome this problem.

Step 470 may be initiated at any time as long as the two databases (a first source database and a second recipient database) are present. In one embodiment, step 470 may be carried out upon the addition of a new second server bucket into server layer 130. In another embodiment, step 470 may be carried out after a predetermined event has taken place. The predetermined event could be the passage of a certain amount of time since the addition of the new second server bucket; a certain number of vehicle transactions received by one or more server, routing, or virtual buckets; or any other event that may initiate this second process.

Data may be copied from a first database to a second database in a fashion similar to that described in step 340 of method 300. However, in step 470, the data in which to transfer may not be dependent on a key or other data received by data network 100. In one embodiment of step 470, the server may sort the VINs (e.g. ascending, descending, etc.) and then start transferring data associated with the first VIN from the first database to the second database. The server in the first server bucket may query the database in the first server bucket to return data for a certain key (e.g. VIN). Upon method 400 reaching step 470 again, the data associated with the next VIN in the sequence may be copied from the first database, such as the database in bucket 132*e*, to the second database, such as the database in bucket 132*f*. If no data for the VIN is found in the database, the next VIN in the sequence may be used. Upon successfully copying the data from the first database in the first server bucket to the second database in the second server bucket, step 480 may proceed. Alternatively, step 480 may only proceed after the first server bucket receives a response signal from the second server bucket indicating the data was successfully copied into the second database.

During step 480, the data that was copied over during the preceding step 470 can be deleted from the first database. The application or server of the first database may use prepared SQL statements, or other statements or database server applications known to those skilled in the art, to delete the data that was copied over to the second database in step 470.

During step 490, it is determined if the steps 470-480 should be carried out again. In one embodiment, this determination may be made by the occurrence of a certain event. For example, if the first database no longer has any more data stored inside of it, then the second process may end. In another example, if all of the desired data has been copied over, then the second process may end. In a yet another example, if the size of data stored in the first or second database reaches a certain size (e.g. the first database size drops below a certain amount of gigabytes; the second database size rises above a certain amount of gigabytes; the second database size is equal to or larger than the first database size), then the second process may end. However, if the event has not occurred, then steps 470-480 may be carried out again.

It is to be understood that the foregoing is a description of one or more embodiments of the invention. For example, the previous two methods (i.e. method 300 and method 400) were described with regard to the specific embodiment of the data network 100 shown in FIG. 2; however, both methods may be carried out by other embodiments of data network 100, such as that which is shown in FIG. 3. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A scalable distributed server system, comprising:
   a top virtual layer that includes a fixed or variable number of virtual buckets, wherein a virtual bucket maps an input to a routing bucket in one or more middle routing layers; and
   a bottom server layer that includes a variable number of servers that each include a database that stores data and an application that recalls data from and stores data into the database, wherein the one or more middle routing layers comprise a variable number of routing buckets that route input received from a virtual bucket in the top virtual layer to a server contained within the bottom server layer.

2. The system of claim 1, further comprising one or more hashing algorithms stored on a non-transitory computer-readable medium, wherein the one or more hashing algorithms are used to route data between virtual buckets of the top virtual layer, routing buckets of the middle routing layer, and servers in the bottom server layer.

3. The system of claim 1, wherein the virtual buckets, routing buckets, and server buckets comprise an application stored on a non-transitory computer-readable medium.

4. The system of claim 3, wherein a virtual bucket, a routing bucket, and a server bucket may be stored on the same non-transitory computer-readable medium on a computer, wherein the computer communicates with other computers.

5. The system of claim 1, wherein the virtual buckets of the top virtual layer, routing buckets of the middle routing layer, and servers in the bottom server layer communicate with one another via a packet-switched data communication protocol.

6. The system of claim 1, wherein the buckets or servers contained within a single layer are located at different geographical locations.

7. A scalable distributed server system, comprising
   a top virtual layer that includes a fixed or variable number of virtual buckets, wherein a virtual bucket maps an input to a routing bucket in one or more middle routing layers; and
   a bottom server layer that includes a variable number of servers that each include a database that stores vehicle transactional data and an application that manages the vehicle transactional data at the database, wherein the one or more middle routing layers comprise a variable number of routing buckets that route the vehicle transactional data received from a virtual bucket to a server in the bottom server layer.

8. The system of claim 7, further comprising one or more hashing algorithms stored on a non-transitory computer-readable medium, wherein the one or more hashing algorithms are used to route vehicle transactional data between virtual buckets of the top virtual layer, routing buckets of the middle routing layer, and servers in the bottom server layer.

9. The system of claim 7, wherein the virtual buckets, routing buckets, and server buckets comprise an application stored on a non-transitory computer-readable medium.

10. The system of claim 9, wherein a virtual bucket, a routing bucket, and a server bucket may be stored on the same non-transitory computer-readable medium on a computer, wherein the computer communicates with other computers.

11. The system of claim 7, wherein the virtual buckets of the top virtual layer, routing buckets of the middle routing layer, and servers in the bottom server layer communicate with one another via a packet-switched data communication protocol.

12. The system of claim 7, wherein the buckets or servers contained within a single layer are located at different geographical locations.

* * * * *